(12) United States Patent  (10) Patent No.: US 8,882,161 B2
Willing et al.  (45) Date of Patent: Nov. 11, 2014

(54) LOCKING DEVICE WITH SIGNAL STRUCTURE

(71) Applicant: Johnson Controls GmbH, Burscheid (DE)

(72) Inventors: Thomas Willing, Köln (DE); Stefan Haida, Remsheid (DE); Alfred Pastoors, Köln (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 13/759,955

(22) Filed: Feb. 5, 2013

(65) Prior Publication Data

US 2013/0236242 A1    Sep. 12, 2013

Related U.S. Application Data

(60) Division of application No. 11/889,342, filed on Aug. 10, 2007, now abandoned, which is a continuation of application No. PCT/EP2006/050849, filed on Feb. 10, 2006.

(30) Foreign Application Priority Data

Feb. 11, 2005  (DE) .......................... 10 2005 006 565

(51) Int. Cl.
 *E05C 3/16* (2006.01)
(52) U.S. Cl.
 USPC .................... 292/216; 292/202; 292/DIG. 23
(58) Field of Classification Search
 USPC ................................. 292/216, 201, DIG. 23
 See application file for complete search history.

(56) References Cited

U.S. PATENT DOCUMENTS

| 3,614,146 A | 10/1971 | Marx |
| 4,005,887 A | 2/1977 | Itakura |
| 4,721,338 A | 1/1988 | Kondo |
| 5,000,495 A | 3/1991 | Wolfgang et al. |
| 5,020,838 A | 6/1991 | Fukumoto |
| 5,547,242 A | 8/1996 | Dukatz et al. |
| 5,582,453 A | 12/1996 | Leuchtmann et al. |
| 5,727,825 A * | 3/1998 | Spurr ....................... 292/341.12 |

(Continued)

FOREIGN PATENT DOCUMENTS

| DE | 43 12 732 C1 | 12/1994 |
| DE | 44 05 346 A1 | 8/1995 |

(Continued)

OTHER PUBLICATIONS

European Search Report for EP 11 00 2092, 12 pages.

(Continued)

*Primary Examiner* — Mark Williams
(74) *Attorney, Agent, or Firm* — Foley & Lardner LLP (57) ABSTRACT

A device in a vehicle for locking and unlocking a locking pin of a component includes using a locking hook that cooperates non-positively or positively with the locking pin to provide an unlocked position and a locked position. The locking hook is actuated between the unlocked position and the locked position by an actuating component. The device includes a signaling means for emitting a mechanical signal to at least one of another of the device and a display. The signaling means is connected to and cooperates with the actuating component to emit the mechanical signal.

8 Claims, 8 Drawing Sheets

(56) References Cited

U.S. PATENT DOCUMENTS

| | | | |
|---|---|---|---|
| 5,855,414 | A | 1/1999 | Daniel et al. |
| 6,412,849 | B1 | 7/2002 | Fast |
| 6,454,320 | B1 | 9/2002 | Weinerman et al. |
| 6,523,376 | B2 * | 2/2003 | Baukholt et al. ............ 70/256 |
| 6,923,478 | B2 | 8/2005 | Geurden |
| 7,152,926 | B2 | 12/2006 | Wrobel |
| 7,740,317 | B2 | 6/2010 | Yamada et al. |

FOREIGN PATENT DOCUMENTS

| | | |
|---|---|---|
| DE | 44 05 698 A1 | 8/1995 |
| DE | 298 11 388 U1 | 11/1999 |
| DE | 100 58 044 A1 | 6/2002 |
| DE | 202 10 658 U1 | 10/2002 |
| DE | 698 05 057 T2 | 11/2002 |
| DE | 101 42 486 A1 | 3/2003 |
| DE | 103 10 848 A1 | 9/2004 |
| EP | 0 669 437 | 8/1995 |
| EP | 0 839 685 A | 5/1998 |
| EP | 1 160 121 A | 12/2001 |
| EP | 1 505 230 A | 2/2005 |
| GB | 2 283 782 | 5/1995 |
| GB | 2 286 624 A | 8/1995 |
| JP | 58-211925 A | 12/1983 |
| JP | 3099367 B2 | 8/2000 |
| JP | 2001-097099 A | 4/2001 |
| WO | WO-97/31799 A1 | 9/1997 |
| WO | WO-01/23207 A | 4/2001 |

OTHER PUBLICATIONS

International Search Report and Written Opinion dated Sep. 26, 2006 as received in corresponding PCT Application No. PCT/EP2006/050849.

Japanese Office Action dated Mar. 13, 2012 as received in the corresponding Japanese Patent Application No. 2007-554564, 3 pages.

Office Action for U.S. Appl. No. 11/889,342, mailed Sep. 30, 2010, 8 pages.

US Office Action received in connection with U.S. Appl. No. 11/889,342 DTD Oct. 5, 2012.

US Office Action received in connection with U.S. Appl. No. 11/889,342; DTD Feb. 28, 2012.

US Office Action received in connection with U.S. Appl. No. 11/889,342; DTD Feb. 3, 2010.

US Office Action received in connection with U.S. Appl. No. 11/889,342; DTD Mar. 16, 2011.

US Office Action received in connection with U.S. Appl. No. 11/889,342; DTD Sep. 12, 2011.

Office Action dated May 14, 2013, as received in corresponding Japanese Patent Application No. 2007-554564 (3 pages).

\* cited by examiner

LOCKING DEVICE WITH SIGNAL STRUCTURE

CROSS-REFERENCE TO RELATED PATENT APPLICATIONS

The present application is a divisional of U.S. patent application Ser. No. 11/889,342, filed Aug. 10, 2007, which application is a Continuation of International Application No. PCT/EP2006/050849, filed Feb. 10, 2006, which claims the benefit of German Patent Application No. DE 10 2005 006 565.1, filed Feb. 11, 2005. The entire disclosures U.S. patent application Ser. No. 11/889,342, of International Application No. PCT/EP2006/050849 and German Patent Application No. DE 10 2005 006 565.1 are incorporated herein by reference.

BACKGROUND

The present application generally relates to devices for locking and unlocking a locking pin of a vehicle component, especially of a backrest of a motor vehicle seat.

Modern seating arrangements in vehicles, especially in motor vehicles, should have good comfort properties and a high degree of flexibility. For example, a user should be able to increase, with few handles and easily, the available loading volume of a motor vehicle by folding the seating arrangement up. In the case of folding seating arrangements, a securely locked seating arrangement is desirable. It is further desirable to provide a securely locking seating arrangement after the seating arrangement has been returned to its initial state, so that in the event of an accident, the crash loads occurring are able to be absorbed by the seat locks.

SUMMARY

One embodiment relates to a device in a vehicle for locking and unlocking a locking pin of a component includes using a locking hook that cooperates non-positively or positively with the locking pin to provide an unlocked position and a locked position. The locking hook is actuated between the unlocked position and the locked position by an actuating component. The device includes a signaling means for emitting a mechanical signal to at least one of another of the device and a display. The signaling means is connected to and cooperates with the actuating component to emit the mechanical signal.

There is further provided a device in a vehicle for locking and unlocking a locking pin of a component using a locking hook that cooperates non-positively or positively with the locking pin to provide an unlocked position and a locked position. The locking hook is actuated between the unlocked position and the locked position by an actuating component. The device includes a signaling means configured to receive a mechanical signal from at least one of a vehicle control and another of the device. The signaling means is connected to the actuating component and the actuating component is configured to actuate based on the received mechanical signal. The vehicle control and the another of the device are not directly associated with the component or the device.

There is yet further provided a device for locking and unlocking a backrest of a motor vehicle seat. A signaling means for receiving a mechanical signal from at least one of a vehicle control, another of the device, and a display. The signaling means is provided in addition to a primary actuating means of the device. The signaling means and the primary actuating means are both connected to an actuating component of the device that actuates the device between an unlocked position and a locked position. The actuating component is configured to actuate based on the received mechanical signal. The signaling means connects and cooperates in parallel with the actuating component.

BRIEF DESCRIPTION OF THE DRAWINGS

The application will become more fully understood from the following detailed description, taken in conjunction with the accompanying figures, in which.

DESCRIPTION

The present application generally relates to a device for locking and unlocking a locking pin of a component, especially of a backrest of a motor vehicle seat. The device includes a locking hook and an actuating component. The locking hook cooperates non-positively and/or positively with the locking pin. In a locked position, the locking hook is secured. By rotating the actuating component, the locking hook is rotated into an unlocked position. The device may further include a locking pawl and a sliding element. The locking hook of the device may be encased.

One embodiment of the invention relates to a device for locking and unlocking the backrest of a seat of a motor vehicle. The device may be easily operated and provide security for the user in the event of a crash. The device may provide uniform locking forces at a variety of temperature ranges. Tolerances such as component tolerances and manufacturing tolerances may be compensated for while providing a device which has minimal clearance between certain components and is therefore quiet.

The device may include a signaling means, by means of which it is able to emit and/or receive a mechanical signal relating to the state of the device or another component to which the device relates. For example, the device may emit external mechanical signals, for example, position signals, occupancy signals or locking states of the device. According to other exemplary embodiments, the device may receive position signals, occupancy signals or locking signals from other devices.

According to various exemplary embodiments, the signaling means is connected in parallel with the actuating component and cooperates therewith. An actuation of the actuating component may be directly displayed on the signaling means. An actuation of the signaling means may also act directly on the actuating component.

According to an exemplary embodiment, the mechanical signal includes the locked position and/or the unlocked position of the locking hook, so that the position state may be displayed to the user, indicating, for example, whether the device is securely locked.

The device may be connected in parallel with a further device, especially another device according to the invention, the mechanical signal being used to synchronize the devices.

The further device with which the device may be synchronized could be any device. The state of the further device may be altered depending on the locking of the device according to the signal, or the device according to the invention being intended to be locked or unlocked, depending on the state thereof.

The synchronization activity may include a simultaneous actuation of at least two devices, of which at least one device is a device according to the invention. The synchronization activity may also include the overlaying of signals. The signals overlaid may be, for example, signals such as position signals, occupancy signals or locking states of a device possibly not according to the invention.

The device may include a display means, by means of which the mechanical signal may be displayed so that a user may react immediately when an unsecured locking is displayed.

The locking hook may be reversibly rotated by the force provided by, for example, a force means to move the locking hook from the locked position into the unlocked position. The locked position may be held in place by the force means. The force means may be a spring, by means of which the locking hook may be coupled to the actuating component.

According to an exemplary embodiment, the device has a locking pawl which may be reversibly adjusted from a release position into a secured position. In the locking pawl's secured position, the pawl secures the locking hook in its locked position. The locking position may thereby be maintained even in the event of a crash. The locking pawl may allow an optimal flux of force and thus a high-load-bearing capacity of the device.

According to various exemplary embodiments, the actuating component includes an adjusting means which, when actuated, only cooperates with the locking pawl after a rotation by a safety angle, so that an inadvertent deflection of the actuating component by powerful acceleration forces, for example, by vibrations or in the event of an accident, does not lead to the adjustment of the locking pawl into the release position. The actuating component is preferably mass balanced and also preferably of substantially disk-shaped configuration. For example, the rotational axis, about which the actuating component is actuated, extends through the center of gravity of the actuating component. As a result, the actuating component is particularly insensitive relative to lateral force acceleration.

The rotation of the locking hook from the unlocked position into the locked position is possible independently of the adjustment of the locking pawl from the release position into the secured position, especially as the locking hook and the locking pawl are not coupled to one another, for example, by a spring. In this case, however, the locking hook is not locked in the locked position.

The adjustment of the locking pawl from the release position into the secured position, may be controlled by a mechanical signal of a further device.

As the signaling means is connected in parallel with the actuating component, it may display the position of the locking pawl. As a result, by means of the mechanical signal, either an unsecured locking may be displayed or the locking may be intentionally prevented by means of a mechanical signal, for example, when a further device is not locked. Moreover, the signaling means allows the display of a secured locking and/or intentional unlocking of the device. The signaling means may also enable the unlocking of the device with other devices simultaneously.

The device may further include a sliding element by means of which the clearance between the locking pin and the locking hook may be reduced in the locked position. As a result, the device may experience or produce less rattling, especially when driving over uneven terrain. Moreover, the sliding element may allow the user to lock the device in a simple and uniform manner.

The sliding element may include a second force means. The force provided by the second force means may retain the locking hook in the locked position with the locking pin. The force of the second force means may be substantially independent of the ambient temperature. The sliding element and second force means may provide for locking to be uniform and remain substantially the same, even at extreme temperatures.

According to an exemplary embodiment, the locking hook is at least partially encased, for example, by a plastics material. As a result, a resilient effect is achieved during locking, which may provide a simple and secure engagement of the locking pawl.

The encasing may include notches and/or bulged portions. The notches and/or bulged portions of the encasing may reduce the clearance between the locking pin and the locking hook, especially in the locked position, whereby a further noise reduction of the device may be effected.

A motor vehicle seat may include the device, according to various exemplary embodiments. The motor vehicle seat including the device may assist the user with a display on which it is displayed to the user whether the motor vehicle seat is securely locked. The device may provide for uniform locking which remains the same at all temperature ranges. The device may also be operated easily and quietly and without rattling during the journey.

Figure 1A:
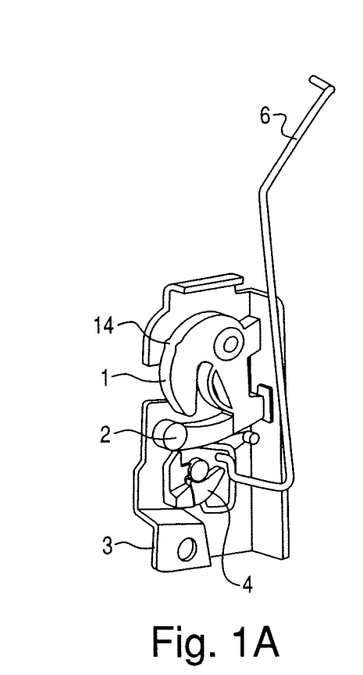
FIG. 1A shows a perspective view of a device with a locking hook in a locked position, according to an exemplary embodiment.
Figure 1B:
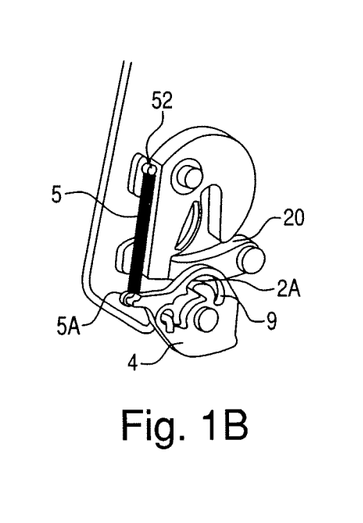
FIG. 1B shows another perspective view of the device of FIG. 1A with the locking hook in the locked position, according to an exemplary embodiment.
Figure 1C:
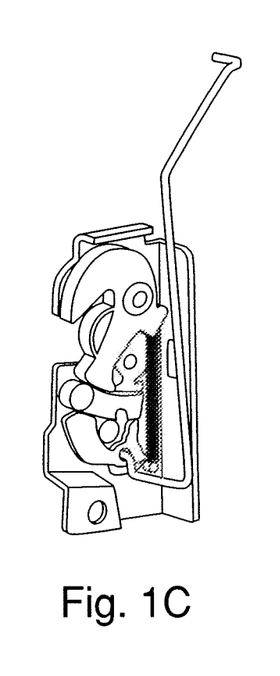
FIG. 1C shows a perspective view of the device of FIG. 1A with the locking hook in an unlocked position, according to an exemplary embodiment.
Figure 1D:
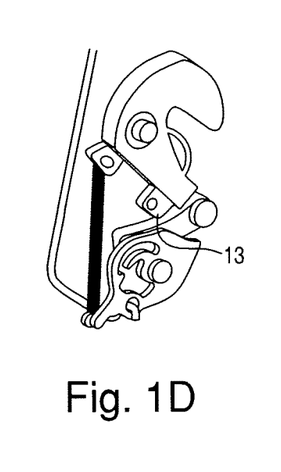
FIG. 1D shows another perspective view of the device of FIG. 1A with the locking hook in the unlocked position, according to an exemplary embodiment.

FIGS. 1A-1D show a device according to an exemplary embodiment. The device includes a locking hook 1. The locking hook 1 in FIGS. 1A-1B is in the locked position, while in FIGS. 1C-1D it is in the unlocked position. In the locked position, shown in FIGS. 1A-1B, the locking hook 1 cooperates positively and/or non-positively with the locking pawl 2, so that the locking hook 1 is secured in the locked position. An actuating component 4 is rotated by actuating an actuating means 6. The actuating component 4 includes an adjusting means 9, in this case a slot. The adjusting means 9 cooperates with the locking pawl 2 via a cam 21, whereby the locking pawl 2 may be rotated from a secured position to a release position. In the secured position, locking hook 1 is secured by the locking pawl 2 in the locked position. In the release position, shown in FIGS. 1C-1D, locking hook 1 is no longer secured by the locking pawl 2 in the locked position. Hereinafter, the terms "adjusting means 9" and "slot" may be used synonymously.

Force means 5, in this case a (tension) spring, includes a first end 51 provided on the actuating component 4 and a second end 52 provided on the locking hook 1. The force provided by force means 5 may pull the locking hook 1 along the contour 20 of the locking pawl 2 into the unlocked position.

The locking hook 1, the locking pawl 2, as well as the actuating component 4, are arranged rotatably on a base plate 3. In the unlocked position, the locking hook 1 bears with a second stop 14 against the base plate 3. Moreover, the locking hook 1 includes a first stop 13 which occasionally bears, in the locked position, against the base plate 3.

The arrangement shown of the locking hook 1 and locking pawl 2 may allow a good flux of force and thus high load bearing, especially in the event of an accident. The arrangement may also provide for good tolerance compensation. For example, a tolerance compensation in the range of approximately +/−3 mm and +/−7 mm is possible. The arrangement is robust relative to its crash behavior, especially with regard to multidirectional acceleration.

The mass of the actuating component 4 is evenly distributed and the actuating component is substantially disk-shaped, so that the actuating component 4 is relatively insensitive to lateral force acceleration. Moreover, the actuating component 4 is adjusted to the locking pawl 2 such that the actuating component 4 releases the locking pawl 2 by means of the slot 9 only after rotating past a safety angle which preferably is 2°-15°. Thus, it is ensured that sufficiently idle stroke range is present so that the locking pawl 2 does not release the locking hook 1 inadvertently, for example, due to a large load, in particular, in the event of a crash. Mass balanced and disk-shaped actuating component 4 may also be relatively insensitive to multidirectional acceleration and thus may ensure a secure locking of the locking hook 1 in the locked position.

According to an exemplary embodiment, after locking pawl 2 has been moved to a release position as a result of the rotation of the actuating component 4, the lightly pretensioned spring 5 is further tensioned and pulls the locking hook 1 along the contour 20 of the locking pawl 2 into the unlocked position. The contour of the locking hook 1 may correspond to the contour 20 of the locking pawl 2 so that the locking pawl 2 maintains its release position when locking hook 1 is in the unlocked position and when the locking hook 1 is rotated from the unlocked position into the locked position.

The spring 5 couples the locking hook 1 to the actuating component 4. The locking pawl is, however, not spring-loaded. The rotation of the locking hook 1 from the unlocked position into the locked position is thus possible independent of the securing of the locking hook 1 by means of the locking pawl 2, i.e. independent of the rotation of the locking pawl 2 from the release position into the secured position, and thus also independent of the rotation of the actuating component 4. The locking hook thus remains, however, unsecured.

Figure 2:
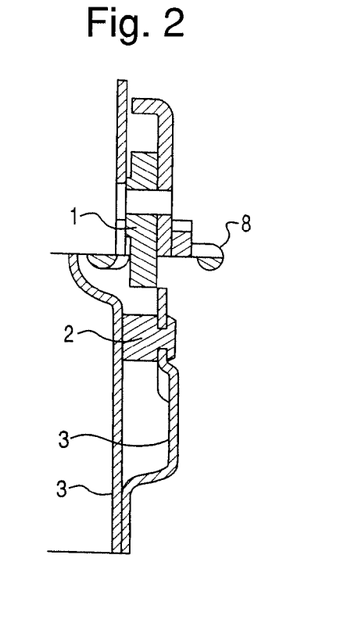
FIG. 2 shows a sectional view of the device of FIG. 1A.

FIG. 2 shows a sectional view of the device shown in FIG. 1A. The device is very compact relative to its width. As the locking hook 1 and the locking pawl 2 are arranged in the vicinity of the base plate 3, locking hook 1 and locking pawl 2 are prevented from twisting.

Figure 3A:
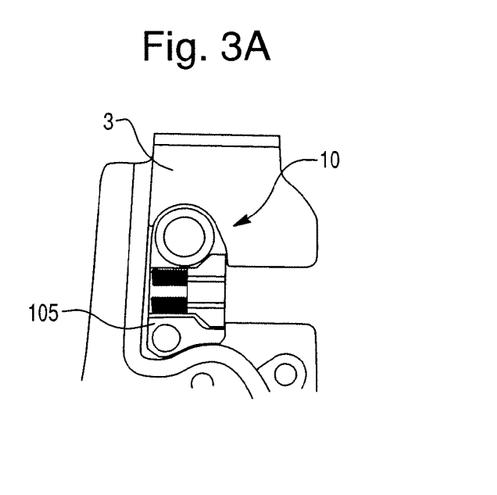
FIG. 3A shows a side view of a device with a sliding element, according to an exemplary embodiment.

FIG. 3A shows a side view of a device having a sliding element 10, according to an exemplary embodiment. The sliding element 10 is made at least partially from a plastics material, and spring-loaded by means of a second force means 16. By means of the sliding element 10, the clearance between the locking hook 1 located in the locked position and the locking pin 8 is reduced. This clearance reduction may result in a device that is relatively quiet and does not rattle.

A steel spring may be used as the second force means 16, as the force of a steel spring is substantially independent of the ambient temperature when compared with conventionally used rubber elements. The sliding element 10, at least in the region of the locking pin 8, is made from a plastics material to avoid unpleasant noise generation, especially by the friction of steel against steel. The spring path of the second force means may be short (e.g., approximately 1-5 mm). The spring path of the second force means is preferably approximately 3 mm. A short spring path may allow the locking to be carried out relatively easily for the user.

Figure 3B:
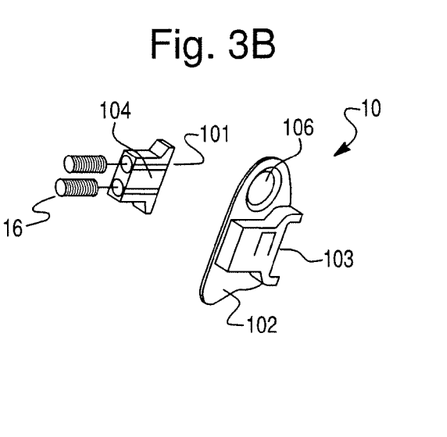
FIG. 3B shows an exploded perspective view of the sliding elements of FIG. 3A.

The embodiment of the sliding element 10 shown in FIGS. 3A-3B includes two second force means 16, in this case compression springs, arranged parallel with one another and thus connected in parallel. Hereinafter, the terms "second force means 16" and "compression spring" are used synonymously. The sliding element 10 includes a receiver component 101 at least partially made of plastics material in which the compression springs 16 are arranged. The receiver component 101 is arranged on a retaining plate 102, which is provided in a rigid manner on the base plate 3 (shown, for example, in FIGS. 1 and 2) and is configured to uniformly guide receiver component 101 along the retaining plate 102 in an effective range which may be approximately four times the pin diameter of the locking pin. The retaining plate includes a projection 103 which is preferably chamfered and which cooperates with a recess 104 of the receiver component 101 to hold the receiver component 101 in a pretensioned, quiet position. Moreover, the projection 103 secures the receiver component 101 in the unlocked position and prevents locking hook 1 from falling out of the retaining plate 102.

The retaining plate 102 may be preassembled with the compression springs and the receiver component 101 on the base plate 3, for example, via a connecting raised portion 105 and subsequently fixed, preferably in a fastening point 106, especially on the seat structure.

Figure 4A:
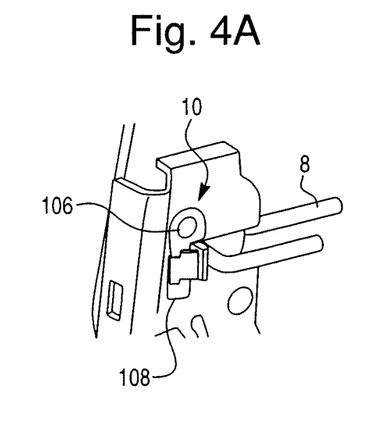
FIG. 4A shows a device with a sliding element abutting a locking pin, according to another exemplary embodiment.
Figure 4B:
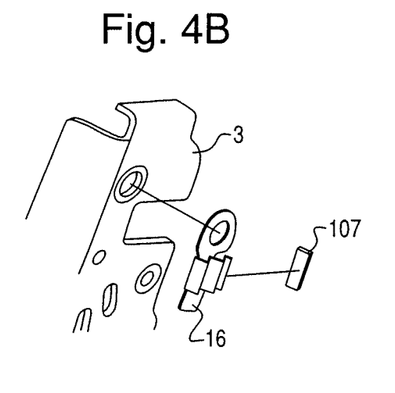
FIG. 4B shows an exploded perspective view of the sliding element of FIG. 4A showing a corrugated spring steel sheet and a plastics component, according to an exemplary embodiment.
Figure 4C:
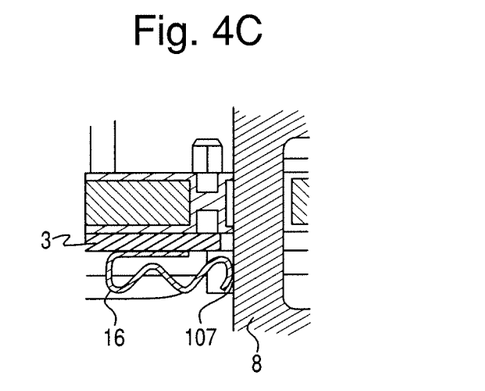
FIG. 4C shows a section view of the device of FIG. 4A with the locking pin abutting the sliding element with a portion of the plastics component interposed between the corrugated spring steel sheet and the locking pin, according to an exemplary embodiment.

FIGS. 4A-4C show another embodiment of a sliding element 10 that may be used with a device of the present application. The sliding element 10 shown in FIGS. 4A-4C includes a corrugated spring steel sheet 16 as a second force means (rather than the compression spring of FIGS. 3A-3B) which is fixed to the base plate 3 of the device via clamping lugs 108. The terms "second force means 16" and "spring steel sheet" may be used synonymously. The sliding element 10 includes a plastics component 107 in the region between the spring steel sheet 16 and the locking pin 8. Plastics component 107 may prevent noises due to friction of the spring steel sheet 16 against the locking pin 8. A uniform pressing-in of the spring steel sheet 16 may be provided. The embodiment of sliding element 10 shown in FIGS. 4A-4C may also provide an effective range of approximately four times the pin diameter of the locking pin 8. Sliding element 10 may be fixed to, for example, a seat structure by the fastening point 106.

Figure 5A:
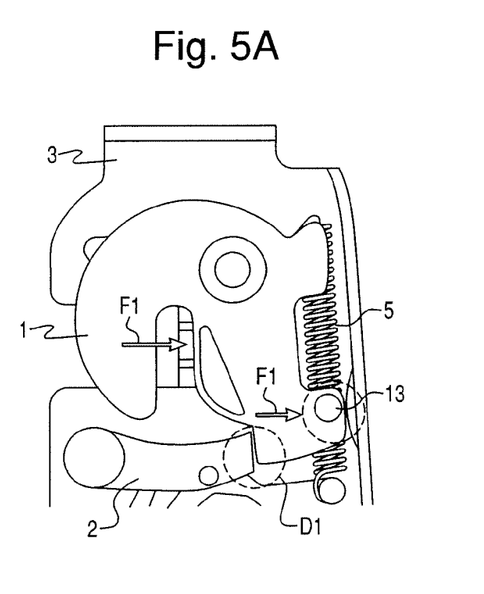
FIG. 5A shows a device having the locking hook being located in the locked position and deforming a portion of the locking hook to form a gap to facilitate rotation of a locking pawl from a release position to a secured position, according to an exemplary embodiment.
Figure 5B:
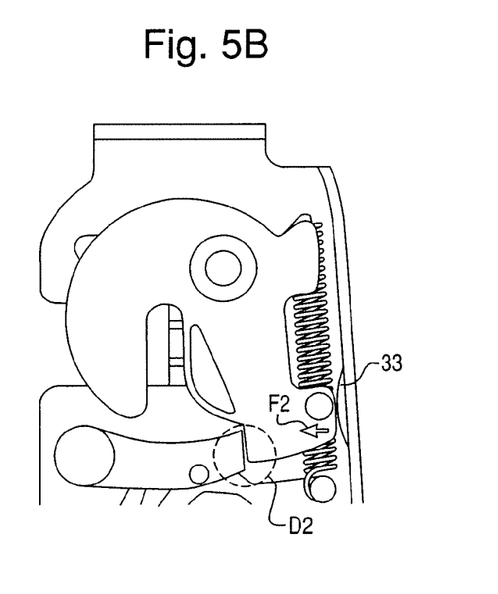
FIG. 5B shows the device of FIG. 5A with the locking pawl in the secured position with a reactive deformation force to reduce the gap between the locking pawl and the locking hook, according to an exemplary embodiment.

FIGS. 5A-5B show a detailed view of a device according to an exemplary embodiment, the locking hook 1 shown located in the locked position. The locking hook 1 is encased, the encasing preferably being of plastics material. During the locking, i.e. during the rotation of the locking hook 1 from the unlocked position into the locked position, the locking pin 8 (previously shown) cooperates with the locking hook 1 at least occasionally and the first stop 13 of the locking hook 1 cooperates at least occasionally with an end stop 33 of the base plate 3. The locking hook 1, as well as the end stop 33, may include a raised portion 130 (shown in FIG. 6) in the contact region of the locking hook 1 with the locking pin 8 and/or the contact region of first stop 13 with the end stop 33. The locking hook 1 is deformed in these contact regions due to the forces acting thereon during the locking (the forces are indicated by arrows F1 in FIG. 5A). The deformation is carried out resiliently due to the shape of the locking hook 1 and/or the first stop 13 and due to the resilience of the plastics material. The reactive deformation force is indicated in FIG. 5B by arrow F2.

During the action of force F1, a gap D1 may be created. Gap D1 may facilitate rotation of the locking pawl 2 from the release position into the secured position in a simple and secure manner. On the other hand, due to the reactive deformation force F2, the gap D2 between the locking pawl 2 and the locking hook 1 is very small, whereby rattling noises are avoided.

The gap D2 is, moreover, reduced or eliminated in the locked position by the action of the first force means 5.

Figure 6:
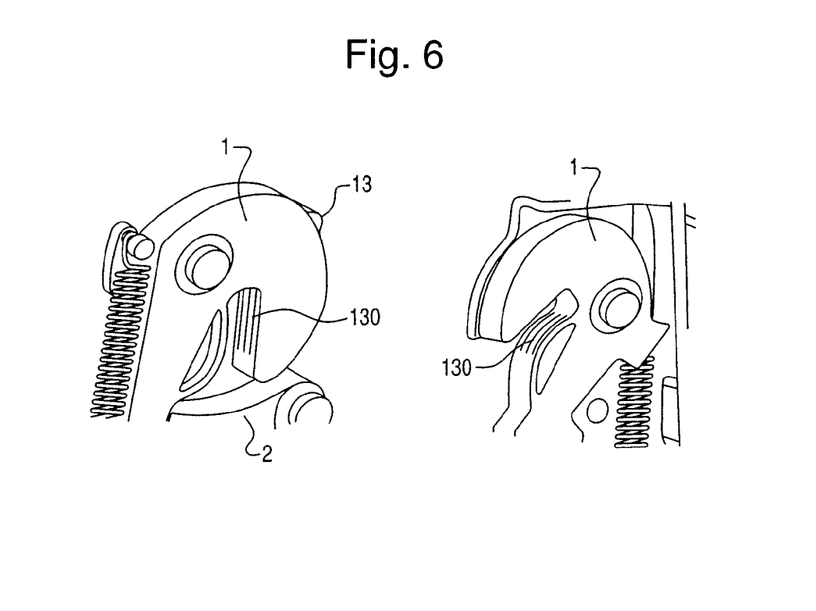
FIG. 6 shows a pair of perspective views of an encased locking hook with a raised portion in a contact region of the locking hook with the locking pin.

FIG. 6 shows the raised portion 130 of the encasing of the locking hook 1, according to an exemplary embodiment. Raised portion 130 is located in the contact region of the locking hook 1 with the locking pin 8 (previously shown). The locking hook 1 includes a hook jaw 17 which is provided on both sides with the raised portion 130. Raised portion 130 minimizes the clearance between the locking hook 1 and the locking pin 8.

FIGS. 7A-7D show the design of the device shown in FIGS. 1A-1D used with a signaling means 7, according to an exemplary embodiment. The signaling means 7 allows the emitting and/or receiving of mechanical signals SO, SI. Signals SO and SI may include, for example, position states, occupancy states or locking states.

The signaling means 7 is arranged parallel to the actuating component 4 and thus is connected in parallel therewith. Signaling means 7 is optional and may thus be retrofitted. Signaling means 7 cooperates with the actuating component 4 by way of a molding 71 of the signaling means 7 engaging in a recess 41 of the actuating component 4.

A mechanical, positive or negative signal SO, SI may, for example, be emitted to the device or received by the device, for example by means of one or more Bowden cables, flexible or flexurally stiff wires, rods or microswitches which are arranged on the signaling means 7.

According to an exemplary embodiment, the mechanical signal SO, SI causes the locking lever to be rotated, namely from the unlocked position into the locked position. If, however, the actuating component 4 is not rotated (e.g., because the locking pawl 2 does not secure the locking lever 1), a display means 11 (shown in FIG. 8) may display an incomplete locking indication to the user. Such an incomplete locking is, for example, an unsecured backrest of a vehicle seat.

The actuating component 4 includes the adjusting means 9 which, when actuated by the actuating means 6, cooperates with the locking pawl 2 only after rotating by a safety angle. The rotation of the locking hook 1 from the unlocked position into the locked position is possible independent of the adjustment of the locking pawl 2 from the release position into the secured position and without the locking hook being secured.

Figure 7A:
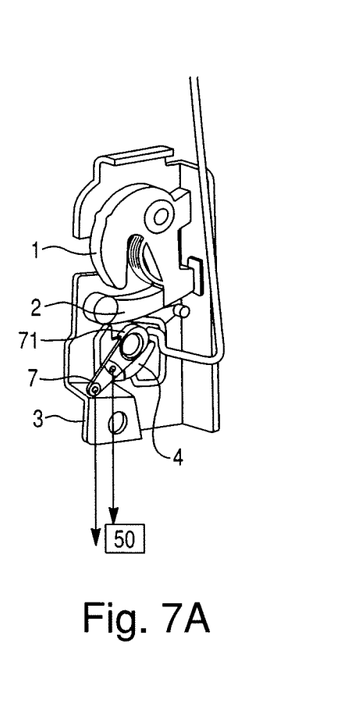
FIG. 7A shows a perspective view of the device of FIG. 1A with a signaling means and with the locking hook in the locked position, according to an exemplary embodiment.
Figure 7B:
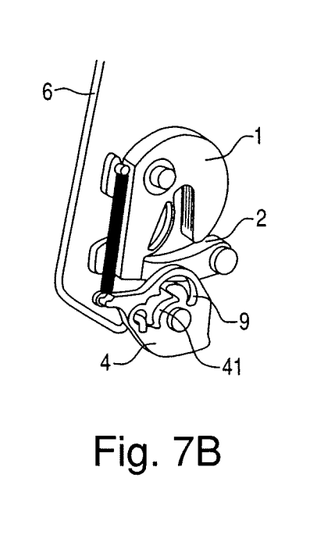
FIG. 7B shows another perspective view of the device of FIG. 1A with the locking hook in the locked position, according to an exemplary embodiment.

FIGS. 7A-7B show the locked position of the locking hook 1 which may be signaled by means of a mechanical signal SO via, for example, a Bowden cable 18. The mechanical signaling may be used, for example, in order to synchronize the actuation of multiple devices so that the actuation takes place simultaneously.

Figure 7C:
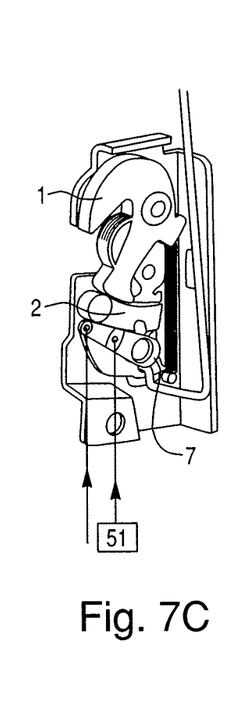
FIG. 7C shows a perspective view of the device of FIG. 1A with the signaling means and with the locking hook in the unlocked position, according to an exemplary embodiment.
Figure 7D:
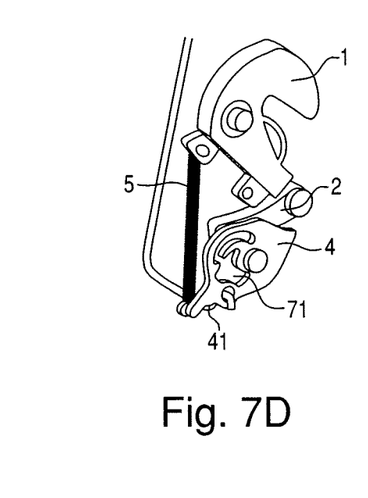
FIG. 7D shows another perspective view of the device of FIG. 1A with the locking hook in the unlocked position, according to an exemplary embodiment.

FIGS. 7C-7D show the unlocked position of the locking hook 1 which may be displayed on a further device (for example, a display means 11 shown in FIGS. 8A-8C) in order to communicate to the user the unsecured state.

Figure 8A:
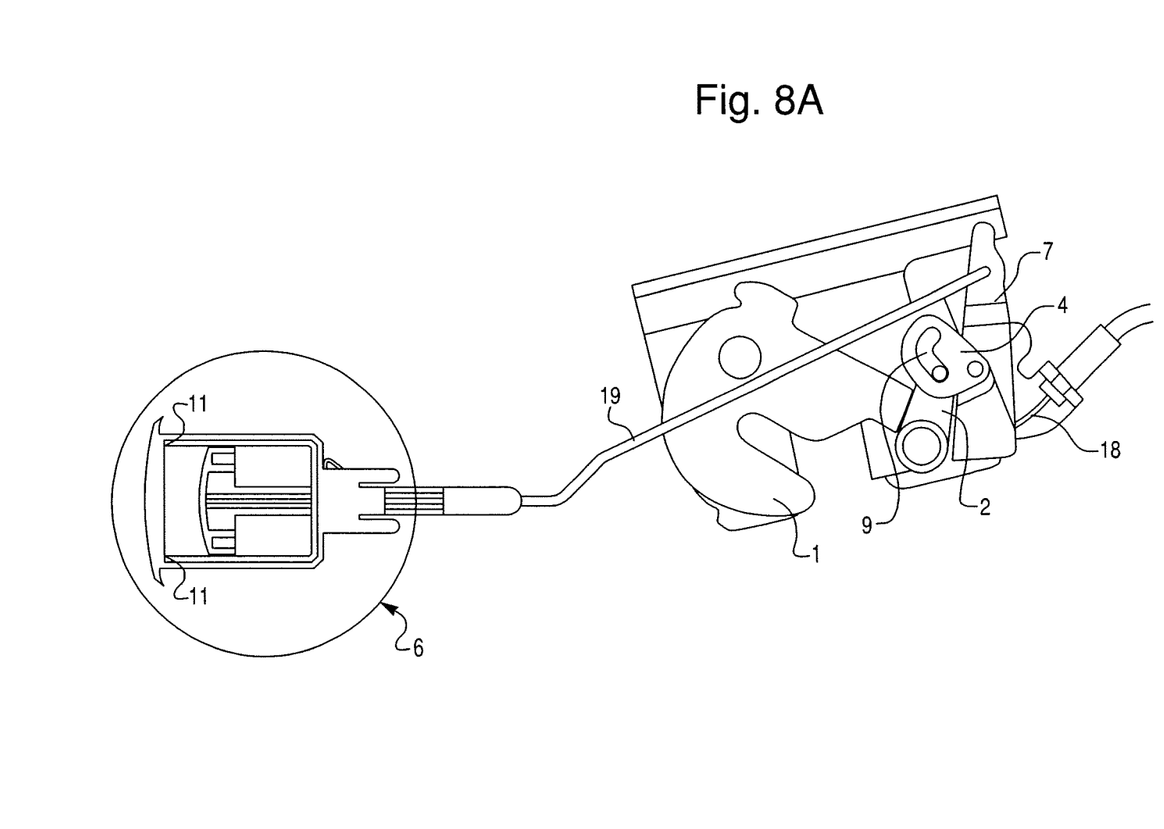
FIG. 8A shows a sectional view of an application of the device with a signaling means in an unlocked state and the display means signaling an insecure lock, according to an exemplary embodiment.
Figure 8B:
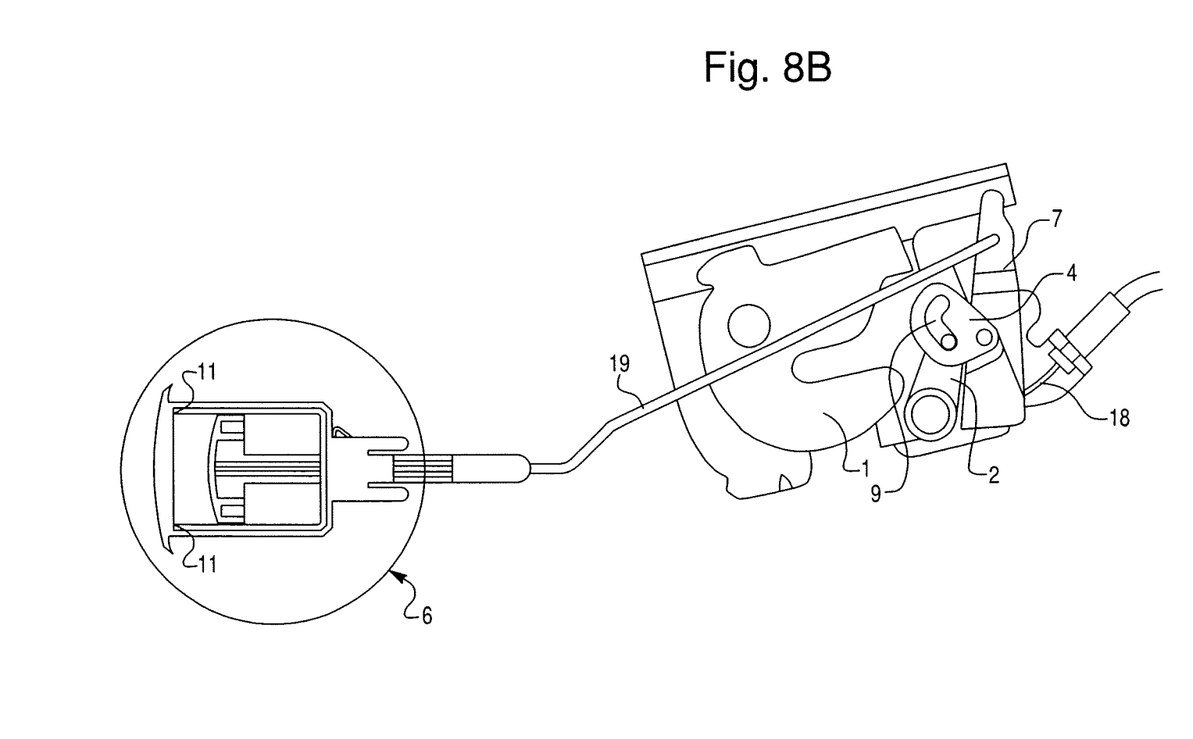
FIG. 8B shows a sectional view of the device of FIG. 8A with the signaling means in a locked state and the display means signaling an insecure lock, according to an exemplary embodiment.
Figure 8C:
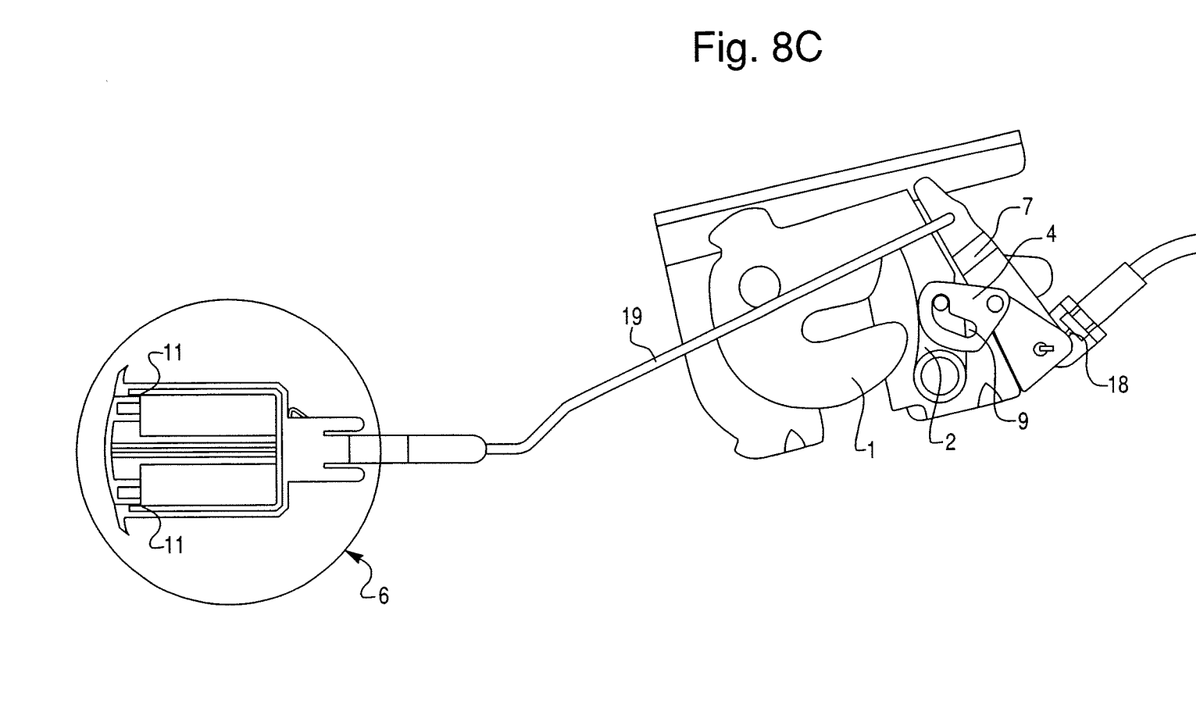
FIG. 8C shows a sectional view of the device of FIG. 8A with the signaling means in a locked state and the display means signaling a secure lock, according to an exemplary embodiment.

FIGS. 8A-8C show an application of the device according to an exemplary embodiment with a signaling means 7. In this application, the device is a backrest lock of a vehicle seat. The signaling means 7 emits a mechanical signal SO to a further device, and/or receives a mechanical signal SI from the further device. The further device may be, for example, a torque block of a center bearing of the vehicle seat. The device includes a display means 11 in order to display to the user an unlocked state of the backrest lock and/or the torque block. The terms "device" and "backrest lock" as well as the terms "further device" and "torque block" may hereinafter be treated synonymously. FIGS. 8A-8C only show the actuating means 6 schematically.

FIG. 8A shows a sectional view of the backrest lock and the torque block in the center bearing in the unlocked state of the backrest lock and in the unlocked state 180 of the torque block. The display means 11 signals an insecurely locked backrest.

FIG. 8B shows a sectional view of the backrest lock and the torque block in the center bearing in the locked state of the backrest lock and in the unlocked state 180 of the torque block. The display means 11 signals an insecurely locked backrest.

FIG. 8C shows a sectional view of the backrest lock and the torque block in the center bearing in the locked state of the backrest lock and in the locked state of the torque block 180. The display means 11 signals a securely locked backrest.

In order to be able to display the locked state of the torque block by means of the display means 11 of the backrest lock, the signaling means 7 of the backrest lock receives the locking state of the torque block as a mechanical signal SI. The signal is transmitted by means of a flexurally stiff Bowden cable 18 which is arranged on the signaling means 7. Moreover, the signaling means 7 is connected to the display means 11 by means of a connecting rod 19.

If the torque block, for example, is insecurely locked by soiling or other circumstances in the center bearing, although the backrest lock is locked, the flexurally stiff Bowden cable 18 thus prevents the signaling means 7 from being rotated and/or the locking pawl 2 from being rotated from the release position F into the secured position S. Due to the connecting rod 19, it is displayed on the display means 11 that the backrest is not completely locked.

Even if the backrest lock is not completely locked, for example, when the locking pawl 2 is not rotated into the secured position S, an insecurely locked device is displayed on the display means 11, independently of the locking state of the torque block, as the signaling means 7 is not reset, due to the adjusting means 9 on the actuating means 4.

By the display means 11 and/or the possibility of mechanical signals SO, SI being emitted to and/or received from further devices, a very secure operation of the device by the user is possible.

What is claimed is:

1. A device for locking and unlocking a pin of a vehicle component, the device comprising:
    a hook that cooperates with the pin to lock the pin and to unlock the pin;
    a base plate rotatably connected to the hook such that the pin is held between the base plate and the hook when the hook is rotated to a locked position;
    a pawl configured to rotate from securing the hook in the locked position to allowing the hook to move;
    an actuating component configured to rotate the pawl by a force provided from a signaling mechanism, wherein the actuating component rotates upon receiving the force from the signaling mechanism, wherein the rotation of the actuating component changes a display element of the device, wherein the signaling mechanism is a first signaling mechanism, wherein the actuating component changes the display element via a second signaling mechanism that is moved by the rotation of the actuating component, and wherein the first and second signaling mechanisms are included in a seating system for the vehicle; and
    a corrugated spring steel sheet having a portion fixed to the base plate and a portion coupled to a plastics component, wherein the corrugated spring steel sheet is located and sized with respect to the base plate and the hook such that the plastics component is elastically held against the pin by corrugated spring steel sheet when the pin is held between the base plate and the hook.

2. The device of claim 1, wherein the device is a first device, and wherein the first device is connected via the first signaling means to a second device for locking and unlocking a pin of a vehicle component.

3. The device of claim 2, wherein the first and second signaling mechanisms and the actuating component are configured to allow a locking state of the first device to be synchronized with the locking state of the second device.

4. The device of claim 1, wherein the actuating component is disk-shaped.

5. The device of claim 1, wherein the actuating component cooperates with and moves the locking pawl via a cam action.

6. The device of claim 1, wherein the mass of the actuating component is substantially evenly distributed.

7. The device of claim 1, wherein the actuating component releases the locking pawl only after the actuating component is caused to rotate past a safety angle.

8. The device of claim 7, wherein the safety angle is between two and fifteen degrees.

\* \* \* \* \*